United States Patent [19]

Mach

[11] Patent Number: 5,104,416
[45] Date of Patent: Apr. 14, 1992

[54] AQUEOUS PREPARATION OF C.I. AZOIC DIAZO COMPONENTS WITH PHOSPHORIC ACID, THEIR PREPARATION AND USE: DIAZOTIZATION AND COUPLING ON CELLULOSE

[75] Inventor: Horst-Roland Mach, Glashütten, Fed. Rep. of Germany

[73] Assignee: Hoechst Aktiengesellschaft, Frankfurt am Main, Fed. Rep. of Germany

[21] Appl. No.: 589,169

[22] Filed: Sep. 27, 1990

[30] Foreign Application Priority Data

Sep. 30, 1989 [DE] Fed. Rep. of Germany ....... 3932819

[51] Int. Cl.$^5$ ..................... C09B 67/36; C09D 11/02; D06P 1/12; D06P 3/68
[52] U.S. Cl. .......................... 8/666; 8/543; 8/549; 8/561; 8/584; 8/918
[58] Field of Search ..................... 8/666, 543

[56] References Cited

U.S. PATENT DOCUMENTS 3,961,887  6/1976  Gronen et al. .......................... 8/532
4,212,646  7/1980  Curtius et al. ......................... 8/532

FOREIGN PATENT DOCUMENTS 819961  3/1975  Belgium .
372536  6/1990  European Pat. Off. .
1496810  1/1978  United Kingdom .
2036810  7/1980  United Kingdom .

OTHER PUBLICATIONS

Gronen, W. et al., *Chem. Abst.* 83:7799058y (1975).

*Primary Examiner*—A. Lionel Clingman

[57] ABSTRACT

In the conventional methods for the preparation of printing pastes containing couplable diazonium compounds, liquid bases, sodium nitrite and phosphoric acid are incorporated separately in succession in the thickener or they are each prepared as separate thickeners and then combined with stirring only when they are used. Such measures are relatively complicated and are therefore considered as a disadvantage in practice. If the acids customary for the diazotization are used, there is a further risk that the fixation by steaming of the reactive dyes printed in addition to the diazo components will be impaired.

This situation considered problematical by persons skilled in the art can be remedied by using liquid water-based preparations of diazotizable amines which, in addition to the amine, simultaneously contain the amount of acid necessary for its diazotization in the form of, preferably, phosphoric acid. These preparations according to the invention only have to be stirred into a thickener containing a nitrite in order to prepare ready-to-use printing pastes.

11 Claims, No Drawings

AQUEOUS PREPARATION OF C.I. AZOIC DIAZO COMPONENTS WITH PHOSPHORIC ACID, THEIR PREPARATION AND USE: DIAZOTIZATION AND COUPLING ON CELLULOSE

DESCRIPTION

The dyeing and printing of cellulose fiber material by means of so-called azo developing dyes by the azoic dyeing technique has been known for a long time and practiced in the textile industry for decades.

In accordance with this principle, C.I. azoic coupling components applied to the fiber are combined there with C.I. azoic diazo components in their couplable form and converted to insoluble azo dyes having good fastness properties.

The general procedure for producing these types of dyeings and prints by coupling thus essentially consists in impregnating the material to be dyed with the coupling component, in short named "naphthol", and in applying the diazo component afterwards.

Of the basic substances required for dye formation, the diazo component is commercially available on the one hand as a stabilized couplable diazonium compound, the so-called color-fast salt, but on the other hand also as still undiazotized primary amine, the so-called color-fast base, which first has to be converted to the directly couplable state by diazotization.

However, for various reasons, the ready-to-use stabilized diazonium compounds are used less and less in practice, and recently color-fast bases have been used preferentially, thus accepting the additional complicated process of diazotization.

Dye manufacturers have therefore taken a lot of trouble to make the diazotization of the amines under consideration as simple as possible.

Since the diazotization proceeds more rapidly and more completely the smaller the particles of the amines in question, the first step was to subject the starting materials to a special treatment. Accordingly, in order to avoid at the same time the hazardous operation of dusting, they were dispersed in finely divided form in an aqueous medium. Such a special pretreatment is documented, for example, in the technical literature by German Patent 2,249,533, German Patent 2,346,502, German Patent 2,449,783, German Patent 2,740,587 and others.

The diazotization of amines converted in this manner into a user-friendly form, designated in the field as liquid bases, in principle does not cause any difficulties for the practice of dyeing. However, in printing, the additional attempt is made to make the preparation of the printing pastes an even safer and easier operation.

In accordance with this intention, German Patent 2,850,901 therefore describes the preparation of printing pastes using couplable diazonium compounds, starting from two separate thickeners. One of them is intended to take up the dispersed amine and sodium nitrite and the other to contain the required acid. By mixing the two thickened mixtures with stirring, the ready-to-use printing paste for the so-called base printing is obtained.

When printing pastes thus prepared for the diazo component are applied together but separately from those of reactive dyes to the material pre-impregnated with naphtholates, not only the variation using customary diazotized bases but also that using color-fast salts have however had the disadvantage that in the case where volatile acids are used for the diazotization procedure—as a result of the typical behaviour associated therewith—the single-phase fixation of the reactive dyes taking place predominantly by steaming is impaired. Owing to this damaging effect, EP-OS 0,372,536 (unpublished) therefore proposes to use acids which are not volatile in steam for the diazotization.

However, even the technique of diazotization-in-the-paste (DIP process) modified in the manner described with the aid of acids which are not volatile in steam is still considered in the printing field as a too complicated process, which—even in combination with the otherwise favorable liquid bases—has so far found little response. The reason for this is primarily the requirement to have two stock thickeners in storage. To this is added the use of phosphoric acid, a chemical until now not customary in textile practice, which despite everything has proven advantageous for this purpose as an acid not volatile in steam for carrying out the processes disclosed in German Patent 2,850,901 and EP-OS 0,372,536. Accordingly, the acceptance of the two procedures largely depends on the willingness of the dyeing and finishing industry to additionally purchase phosphoric acid.

The ease of processing preparations of the diazo component containing liquid bases led to the idea to develop products on this basis which are easy to use and make their industrial application much easier for one skilled in the art. In the context of a general approach to using reactive dyes in Africa printing without the addition of alkali on a material impregnated with naphtholate in combination with color-fast bases, diazotized with a non-volatile acid, and fixation by the single-phase process by steaming for a short period of time (at most 8 minutes), the preparation of a standard range of preparations of diazotizable aromatic amines immediately usable without any further treatment plays a key role.

The object of the present invention was therefore to render the production of azo developing dyes in base printing more efficient and more economical by taking suitable precautions, without forcing the textile printing plants to obtain and store additional starting materials hitherto not used in conventional procedures, but at the same time to ensure that the problem-free single-phase fixation of reactive dyes applied together in the same printing process is not impaired or even excluded thereby.

This object is achieved according to the invention by preparing a stable liquid water-based formulation of the primary aromatic amines, which contains the acid required for the diazotization and the coupling in the form of an acid which is not volatile in steam.

These selective measures make it easier for the printer to produce ready-to-use printing pastes compared with the prior art in that a) no more than a single stock thickener containing sodium nitrite is necessary and consequently b) these printing pastes can be prepared simply by stirring the liquid base formulations according to the invention into the stock thickener a).

Further advantages of the use of the preparations according to the invention arise from c) the dust-free processing thereof, d) their usability not only in pure base printing but also in printing where reactive dyes are additionally used, e) the fact that additional storage of chemicals previously not customary in dyeing and finishing plants is avoided, and in particular f) the easy handling.

The preparation of the liquid preparations according to this invention and their use is described below:

Suitable diazotizable amines (including amino azo dyes) are in principle all those suitable for the customary azoic dyeing technique.

The primary aromatic amines (C.I. azoic diazo components) obtained from their synthesis in dry form as a powder or in the form of a water-moist paste are carefully stirred together with water and the intended acid which is not volatile in steam, usually phosphoric acid. Acids of this type which can also be used are citric acid, glycolic acid, lactic acid, tartaric acid and the like or mixtures thereof.

The amount of acid used for this is selected such that—in accordance with its molecular weight—it is sufficient on the one hand for forming the amine salt and furthermore for the diazotization and adjusting of the correct pH for the coupling reaction. Accordingly, if free primary amines are present, this amount is 3 to 4 times, if the amine salt is present, only 1.5 to 2.5 times, the weight of the amine.

Depending on the chemical nature and/or the physical properties of the starting amine, first the amine salt must be formed with hydrochloric acid in some cases, before the acid which is not volatile in steam can be added.

The addition of solubilizing or dissolution-promoting and/or dispersing products, for example small amounts of a hydrotrope, such as polyhydric alcohols, in particular glycerol, or ethoxylates, can have a favorable effect on the production of the preparation.

If necessary, an acid- and electrolyte-resistant thickener, preferably a linear polysaccharide of high molecular weight of the xanthan series, is additionally stirred into the solution of the amine thus obtained for stabilization.

The application of the liquid preparations of primary aromatic amines thus obtainable is extremely simple:

Only a single acid-resistant stock thickener based on natural or preferably synthetic materials needs to be prepared and stored together with sodium nitrite. The printing pastes are prepared by simply stirring the preparations described above into the stock thickener, and the pastes can then be used directly for printing.

The preparation examples which follow only define the framework of the invention, without limiting it in any way.

EXAMPLES

A) Preparation of the amine preparations

1. Stock color orange
   - 125 g of azoic diazo component 2 of C.I. No. 37005 (m-chloroaniline) are slowly stirred together with
   - 165 g of water and
   - 400 g of 85% phosphoric acid. Then
   - 260 g of a 2% thickener based on a linear polysaccharide of high molecular weight of the xanthan series is stirred into this batch and finally
   - 50 g of glycerol are added with stirring
   - 1000 g.

2. Stock color red
   - 155 g of azoic diazo component 10 of C.I. No. 37120 (5-chloro-o-anisidine) are initially stirred in
   - 230 g of water to form the chlorohydrate and then dissolved by treatment with
   - 100 g of 32.1% hydrochloric acid (20° Bé), after which
   - 240 g of 85% phosphoric acid are slowly added to this solution with stirring.
   - 225 g of a 2% xanthan thickener corresponding to stock color 1 are then stirred into this batch and finally
   - 50 g of glycerol are added with stirring
   - 1000 g.

3. Stock color bordeaux
   - 165 g of azoic diazo component 1 of C.I. No. 37125 (2-nitro-p-anisidine) are slowly stirred together with
   - 155 g of water and
   - 400 g of 85% phosphoric acid.
   - 230 g of a 2% xanthan thickener corresponding to stock color 1 are then stirred into this batch and finally
   - 50 g of glycerol are added with stirring
   - 1000 g.

4. Stock color blue
   - 400 g of the azoic diazo component 35 of C.I. No. 37255, which is present as a sulfate, [N-(p-methoxyphenyl)-p-phenylenediamine. ½ sulfate] are slowly stirred together with
   - 200 g of water and
   - 240 g of 85% phosphoric acid.
   - 110 g of 2% xanthan thickener corresponding to stock color 1 are then stirred into this batch and finally
   - 50 g of glycerol are added with stirring
   - 1000 g.

5. Stock color black
   - 150 g of azoic diazo component 38 of C.I. No. 37190 (coupling product from diazotized p-nitroaniline and 2,5-dimethoxyaniline) are slowly mixed with
   - 300 g of water and
   - 50 g of 32.1% hydrochloric acid (20° Bé) with stirring to form the chlorohydrate and dissolved.
   - 100 g of 85% phosphoric acid and
   - 200 g of citric acid are then stirred into this mixture and finally
   - 200 g of glycerol are added with stirring
   - 1000 g.

B) Use of the amine preparations

Impregnation of the fabric 20 g of azoic coupling component 2 of C.I. No. 37505 (2-hydroxy-3-naphthoylaminobenzene) are stirred into 1 l of hot water (95° C.) containing 20 cm$^3$ of 32.5% sodium hydroxide solution (38°Bé) and 5 g of a protective colloid based on modified protein and dissolved.

This solution is used to pad a cotton fabric at a liquor pickup of 80% (relative to the weight of the dry fabric), and the fabric is then dried.

PRINTING EXAMPLE 1

To prepare a printing paste of a couplable diazonium compound, 800 g of an acid-resistant stock thickener of synthetic origin, which already contains 6.5 g/kg of sodium nitrite, are initially introduced. 50 g of the stock color orange obtained according to preparation 1 are then added with stirring, and the entire batch is finally made up with water to a total weight of 1 kg. The printing paste thus prepared is used to print a section of the fabric impregnated with the abovementioned coupling component, to give a bright, brilliant orange shade.

The aftertreatment of the resulting color print is carried out as usual by soaping twice with alkali and finally rinsing with water until the wash water is clear.

PRINTING EXAMPLE 2

The preparation of the first printing paste as described in Printing example 1 is repeated, except that preparation 2 (stock color red) is used. The second printing paste is prepared as follows: 800 g of an alginate thickener of medium viscosity, to which previously 20 g/kg of m-nitrobenzenesulfonic acid as sodium salt (dissolved in water at a ratio of 1:2) had been added, are initially introduced, and 60 g of the reactive dye of the formula

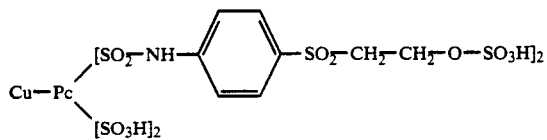

(Cu-Pc=copper phthalocyanine) are then added with stirring. The entire batch is then made up with water to a total weight of 1 kg with water and thorough stirring is continued for 1 minute.

Both printing pastes are then printed side by side onto the fabric preimpregnated with the coupling component and the printed substrate is then dried.

The reactive dye is fixed by steaming the material thus treated with saturated steam at 102° C. for 8 minutes.

Finally, the resulting color print is, as is usual for reactive dyes, washed, and the treatment is completed. The coloristic effect obtained is a brilliant turquoise in addition to a deep red shade.

PRINTING EXAMPLE 3

The first printing paste is prepared by initially introducing 800 g of an acid-resistant stock thickener, as in Printing Example 1, which thickener contains 6.5 g/kg of sodium nitrite. 100 g of preparation 5 (stock color black) are then stirred into this mixture, which is then made up with water to a total weight of 1 kg, after which stirring is continued for 1 minute. The second printing paste is prepared by initially introducing 800 g of an alginate thickener of medium viscosity, which contains 20 g/kg of m-nitrobenzene-sulfonic acid as sodium salt (dissolved 1:2 in water). While treating this mixture with a high-speed stirrer, 60 g of the reactive dye of the formula pletely, the paste is stirred for another 3 minutes with the aid of the high-speed stirrer.

Both printing pastes are then printed side by side onto the fabric preimpregnated with the coupling component, and the printed substrate is then dried.

The reactive dye is fixed by steaming the material thus treated in saturated steam at 102° C. for 8 minutes.

Finally, the resulting color print is, as is usual for reactive dyes, washed, and the treatment is completed. The coloristic result obtained is, in addition to a black color, a bright golden-yellow color having sharp contours.

PRINTING EXAMPLE 4

To prepare the printing paste of a couplable diazonium compound, 800 g of an acid-resistant stock thickener are initially introduced, as in Printing Example 1, which thickener already contains 6.5 g/kg of sodium nitrite. 50 g of the stock color obtained according to preparation 2 are then stirred into this mixture, after which—likewise while treating it with the high-speed stirrer—a solution comprising 25 g of the dye Ingrain Blue 5 of C.I. No. 74161:2,
50 g of 80% phosphoric acid (diluted 1:8 with water) and
50 g of water are added. Finally, the entire batch is made up to a total weight of 1 kg with water.

This printing paste is then printed onto a cotton fabric which had been padded at a liquor pickup of 80% (relative to the dry weight) with a hot aqueous solution (95° C.) containing 20 g/l of C.I. azoic coupling component 5 of C.I. No. 37610 (3,3'-dimethyl-4,4'-bis(acetoacetylamino)-diphenyl),
20 cm³/l of 32.5% sodium hydroxide solution (38°Bé) and
5 g/l of a protective colloid based on protein and dried at 100° C., which fabric is afterwards again dried.

The blue portion in the printing ink is fixed by steaming the material thus treated in saturated steam at 102° C. for 5 minutes.

The resulting color print is then rinsed with cold and hot water, soaped at the boiling temperature, again rinsed with cold water and finally dried.

The result is a printed pattern on the fabric having a brilliant green shade on white ground.

I claim:

1. A liquid, aqueous composition comprising a primary aromatic amine suitable for the azoic dyeing technique or a salt thereof, which contains an acid or a mixture of acids being not volatile in steam, the acid being present in a 3 to 4 times stoichiometric amount calculated on the free primary aromatic amine or in a 1.5 to 2.5 times stoichiometric amount calculated on the

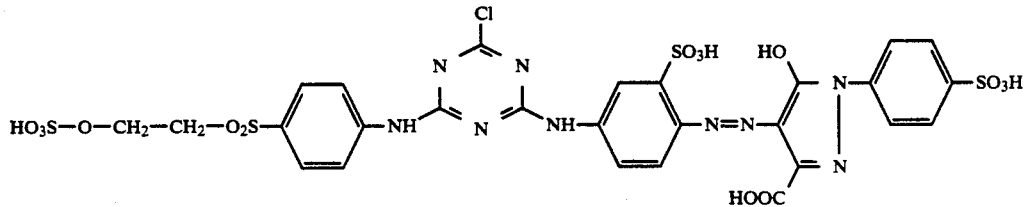

are added, and then the entire batch is made up to a total weight of 1 kg with water. To dissolve the dye completely, salt on the primary aromatic amine.

2. A composition as claimed in claim 1, in which phosphoric acid is the acid which is not volatile in steam.

3. A composition as claimed in claim 1, which additionally contains a hydrotrope as a solubilizing and/or dispersing agent.

4. A composition as claimed in claim 1, which is essentially free of thickener.

5. A composition as claimed in claim 3, wherein the hydrotrope is a polyhydric alcohol.

6. A composition as claimed in claim 3, wherein the hydrotrope is an ethoxylate.

7. Method of using a composition as claimed in claim 1 for preparing printing pastes, wherein the composition is stirred into thickeners containing sodium nitrite.

8. A method of use as claimed in claim 7, wherein in the preparation of the printing pastes C.I. Ingrain dyes are additionally incorporated.

9. A method of use as claimed in claim 7 wherein the resulting printing paste is printed onto cellulose-containing textiles or textiles exclusively made of cellulose fibers which have previously been impregnated with C.I. azoic coupling components under alkaline conditions and dried.

10. A method of using a printing paste prepared as claimed in claim 7, which comprises printing close to said printing paste at least one further printing paste containing reactive dyes onto a cellulose or cellulose-containing textile material which has previously been impregnated under alkaline conditions with C.I. azoic coupling components and fixing the reactive dyes by steaming.

11. A liquid, aqueous composition comprising (a) a primary aromatic amine suitable for the azoic dyeing technique or a salt thereof, and (b) an acid or a mixture of acids being not volatile in steam, the acid being present in a 3 to 4 times stoichiometric amount calculated on the free primary aromatic amine or in a 1.5 to 2.5 times stoichiometric amount calculated on the salt of the primary aromatic amine, said composition being essentially free of thickener or containing, as essentially the only component having any thickening properties, an acid- and electrolyte-resistant polysaccharide having repeating xanthan units.

* * * * *